United States Patent [19]

Svanström

[11] 3,752,594
[45] Aug. 14, 1973

[54] TURRET TYPE UNIVERSAL MILLING, DRILLING AND BORING MACHINE

[75] Inventor: Sven-Erik Svanström, Vasteras, Sweden

[73] Assignee: SMT Machine Company AB, Vasteras, Sweden

[22] Filed: Nov. 19, 1971

[21] Appl. No.: 200,333

[30] Foreign Application Priority Data
Dec. 7, 1970 Sweden............................ 16491/70

[52] U.S. Cl.................................. 408/35, 29/26 A
[51] Int. Cl....................... B23b 39/20, B23q 3/157
[58] Field of Search................. 29/26, 26 A; 408/35

[56] References Cited
UNITED STATES PATENTS 3,344,512  10/1967  Zucchellini........................... 29/568
R25,670    10/1964  Hansen et al......................... 408/35

Primary Examiner—Francis S. Husar
Attorney—Karl W. Flocks

[57] ABSTRACT

A universal milling, drilling and boring machine for a plurality of rotary tools includes a headstock having a drive. The headstock comprises a drum rotatably mounted thereto and equipped with a number of spindle units for the rotary tools which units are rotatably mounted on the drum and which in normal position are oriented at least substantially parallel with the axis of rotation of the drum. The headstock has an operating unit which is adapted to swing the spindle unit opposite the drive into operative position in the headstock, in which position the drive is connectable to the spindle unit.

5 Claims, 3 Drawing Figures

PATENTED AUG 14 1973　　　　　　　　　　3,752,594

TURRET TYPE UNIVERSAL MILLING, DRILLING AND BORING MACHINE

This invention relates to a universal milling, drilling and boring machine for a plurality of rotary tools, including a headstock having a drive. In the machine according to the invention the headstock comprises at least one drum rotatably mounted thereto and equipped with a number of spindle units for the rotary tools which units are rotatably mounted on the drum and in normal position are oriented at least substantially parallel with the axis of rotation of the drum, and an operating unit is provided in said headstock and adapted to swing the spindle unit opposite the drive into operative position in the headstock, in which position the drive is connectable to the spindle unit.

The universal milling, drilling and boring machine according to the invention is for use in automatized milling, drilling, boring and thread cutting operations and in performing a relatively large number of part operations on a workpiece by different rotary tools. Compared to the turret machine, the machine according to the present invention primarily entails the advantage of accommodating a larger number of tools. Compared to so-called multiple purpose machines in which the tools are changed over from a magazine to the spindle and vice versa, the machine according to the invention above all implies great economical advantages.

One embodiment of the invention will be more fully described hereinbelow with reference to the accompanying drawing in which.

The machine is an upright milling, drilling, boring and thread cutting machine and the headstock 2 is mounted to the post 1 of the machine. The headstock 2 is adapted to be moved vertically towards the coordinate table 4 for the workpiece.

Figure 1:
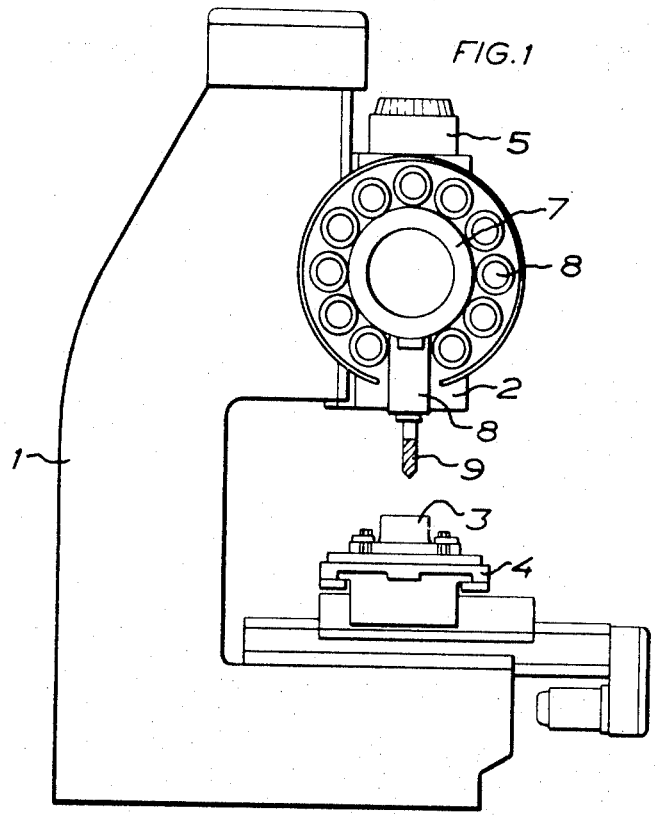
FIG. 1 is a side view of the machine.
Figure 2:
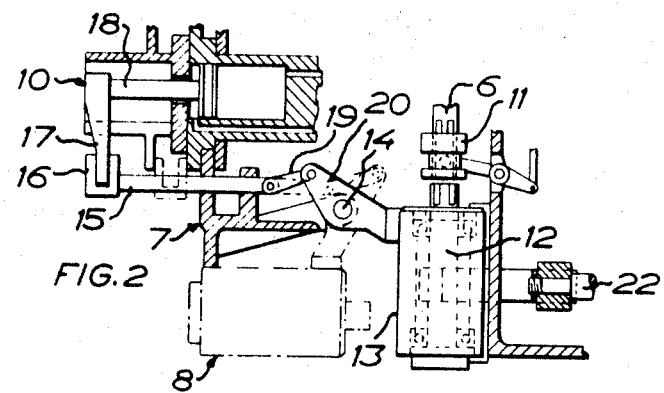
FIG. 2 is a longitudinal section of parts of the headstock.

The headstock 2 has a drive 5 comprising a gearing system and a drive motor, the output shaft of the gearing system being designated 6 in FIG. 2. The headstock 2 also has a drum 7 rotatably mounted thereto and equipped with a number of spindle units 8 for the rotary tools 9. The spindle units 8 are pivotally mounted to the drum and adapted normally to be oriented at least substantially parallel with the axis of rotation of the drum 7.

The headstock 2 has an operating mechanism 10 in the form of a cylinder and piston assembly which is adapted to swing the spindle unit 8 opposite the drive 5 into operative position at right angles to the axis of the drum 7, as will be seen from FIG. 2. In the operative position the drive 5 is connectable to the spindle unit 8 in that the spline sleeve 11 on the output shaft 6 of the gearing system is moved downward, uniting the spindle unit 8 with the drive motor. Operation can now start.

Each of the spindle units 8 is composed of an inner rotary tool-carrying spindle 12 and an outer housing 13 surrounding the spindle 12, said housing 13 being pivotally mounted to the drum 7 by means of journals 14.

The operating mechanism 10 which is common to all spindle units 8 is arranged in the center of the headstock 2. To permit the operating mechanism 10 to be coupled with the different spindle units 8, said units have an operating rod 15 with a fork-shaped shifter 16. The shifter 16 engages a projection 17 on the piston rod 18 of the cylinder and piston assembly 10 and actuates the respective spindle unit 8 via the operating rod 15 and a link 19 by engaging a swing arm 20 mounted on the journal 14.

Figure 3:
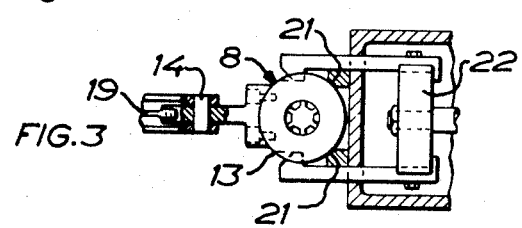
FIG. 3 is a plan view, partly in section, of some of the parts shown in FIG. 2.

As will appear from FIG. 3, the headstock 2 has engagement surfaces 21 against which the housings 13 of the spindle units 8 are adapted to bear in the operative position, whereby said position is exactly determined. For their fixation in the operative positions determined by the engagement surfaces 21 the spindle units 8 are adapted to coact with a driving key transmission 22.

After accomplished operating cycle the spindle unit 8 is released and swung into its horizontal storage position in which it is parallel with the axis of rotation of the drum 7. The drum can now be indexed by one step so that the next spindle unit 8 is brought in position for being swung into operative position.

In the embodiment illustrated the drum 7 has twelve spindle units 8 but the number of spindle units can be varied within broad limits.

What I claim and desire to secure by Letters Patent is:

1. A universal milling, drilling and boring machine for a plurality of rotary tools, including a headstock having a drive, wherein the headstock comprises at least one drum rotatably mounted thereto and equipped with a number of spindle units for the rotary tools which units are rotatably mounted on the drum and in normal position are oriented at least substantially parallel with the axis of rotation of the drum, and an operating unit is provided in said headstock selectively connectable with said spindle units for pivoting the spindle unit opposite the drive into operative position in the headstock, in which position the drive is connectable to the spindle unit.

2. A machine as claimed in claim 1, wherein each of the spindle units is composed of an inner rotary tool-carrying spindle and a housing surrounding the spindle and pivotally mounted to the drum.

3. A machine as claimed in claim 1, wherein the operating unit is a cylinder and piston or like unit which is connectable with the different spindle units.

4. A machine as claimed in any of claim 1, wherein the headstock has engagement surfaces against which the spindle units bear in operative position.

5. A machine as claimed in claim 4, wherein the spindle units when in operative position coact with a clamping device.

* * * * *